(12) United States Patent
Wachtel

(10) Patent No.: US 6,195,654 B1
(45) Date of Patent: *Feb. 27, 2001

(54) SYSTEM AND METHOD FOR OBTAINING IMPROVED SEARCH RESULTS AND FOR DECREASING NETWORK LOADING

(76) Inventor: Edward I Wachtel, 290 3rd Ave. 19F, New York, NY (US) 10010

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/751,613

(22) Filed: Nov. 18, 1996

Related U.S. Application Data

(60) Provisional application No. 60/006,863, filed on Nov. 16, 1995.

(51) Int. Cl.$^7$ ............................................. G06F 17/30
(52) U.S. Cl. ........................ 707/3; 707/2; 707/5; 707/10; 709/217; 709/218; 709/219
(58) Field of Search ................... 707/5, 10, 3, 2; 395/200.33, 200.03, 200.09, 200.57; 364/284, 282.4; 346/282.1; 709/217, 218, 219

(56) References Cited

U.S. PATENT DOCUMENTS

| | | |
|---|---|---|
| 5,063,522 | 11/1991 | Winters . |
| 5,301,314 * | 4/1994 | Gifford et al. ............................ 707/5 |
| 5,313,559 | 5/1994 | Ogata et al. . |
| 5,404,505 * | 4/1995 | Levinson ................................. 707/7 |
| 5,483,652 * | 1/1996 | Sudama et al. ........................... 707/5 |
| 5,493,728 * | 2/1996 | Solton et al. ........................ 395/250 |
| 5,499,221 * | 3/1996 | Ito et al. ................................ 369/32 |
| 5,600,831 * | 2/1997 | Levy et al. ............................... 707/2 |
| 5,617,565 * | 4/1997 | Augenbraun et al. ................... 707/4 |
| 5,655,088 * | 8/1997 | Midorikawa et al. ................ 395/237 |
| 5,659,732 * | 8/1997 | Kirsch ..................................... 707/5 |
| 5,682,478 * | 10/1997 | Watson et al. .................. 395/200.12 |
| 5,710,884 * | 1/1998 | Dedrick ........................... 395/200.47 |
| 5,761,436 * | 6/1998 | Nielsen ............................... 709/245 |
| 5,813,009 * | 9/1998 | Johnson et al. ...................... 707/100 |
| 5,819,243 * | 10/1998 | Rich et al. ............................. 706/11 |
| 5,826,025 * | 10/1998 | Gramlich ............................ 709/217 |
| 5,870,546 * | 2/1999 | Kirsch ............................. 395/200.33 |
| 5,875,437 * | 2/1999 | Atkins ..................................... 705/40 |
| 5,933,811 * | 8/1999 | Angles et al. .......................... 705/14 |
| 5,954,798 * | 9/1999 | Shelton et al. ....................... 709/224 |
| 5,960,422 * | 9/1999 | Prasad ..................................... 707/2 |
| 6,035,339 * | 3/2000 | Agraharam et al. ................. 709/246 |

* cited by examiner

Primary Examiner—Hosain T. Alam
Assistant Examiner—Jean M. Corrielus
(74) Attorney, Agent, or Firm—Craig E. Shinners

(57) ABSTRACT

A networked information sharing model is described. The network described comprises a client-server model or a client only model. There exists a shared information database, a shared category database, a shared interest profile database and a shared client enhancement database, each of which is continually and dynamically updated. The shared category database contains categories of interests, within which are weighted and marked information units. Weights are arrived at by empirical use. Marks are maintained to distinguish where the information came from and to access information according to client source preference. The shared interest profile contains a set of profiles which clients are associated with. Useful client categories within profiles are offered when requested. A shared client enhancement list is maintained to identify and weight useful sources of information. A client specific database is maintained with client categories, preferred information sources, weights and weighted information access history. This database is used in conjunction with the shared databases to provide intelligent information sharing.

17 Claims, 14 Drawing Sheets

SUGGESTED INTEREST CATEGORIES

- NODE 6
- NODE 7
- NODE 8

34

CURRENT INTEREST CATEGORIES

- NODE 1
- NODE 2
- NODE 3
- NODE 4
- NODE 5

36

CHILD EXPANDED NODE

- NODE 3A
- NODE 3B
- NODE 3C

38

PARENT EXPANDED NODE  40

NODE 3E — NODE 3D — NODE 3

FIGURE 2

CLIENT DATABASE 28A

INTEREST CATEGORY

INFORMATION UNITS ACCESSED

SYSTEM AND METHOD FOR OBTAINING IMPROVED SEARCH RESULTS AND FOR DECREASING NETWORK LOADING

This application claims the benefit of prior provisional application Ser. No. 60/006,863, filed on Nov. 16, 1995.

BACKGROUND

1. Field of Invention

This invention relates to computer systems and in particular to an intelligent means of acquiring, storing and sharing information.

2. Description of Prior Art

Servers on the Internet contain vast quantities of information and are distributed around the globe. However, the vast majority of information is of no use to a particular person. Finding information of use requires considerable knowledge as well as time and money. Mosaic offers a graphical user interface to the Internet making access easier. Yet there are tens of thousands of servers to choose from and a large quantity of information to sift through once on an individual server. Furthermore, the server is usually slow due to the number of persons logged onto it and by the network traffic to communicate with it.

There are librarian servers on the Internet which scan thousands of servers and catalogue the files on the servers. However, these librarian servers are slow due to the magnitude of the search and the large number of requesters. Further, one may find hundreds of potential files on a given topic; accessing and reading the files to find useful ones takes and wastes considerable time. These servers may cover some topics to a considerable degree and others sparsely.

Services such as CompuServe and America Online alleviate congestion problems to a considerable degree by charging money. However, since the on-line service is charging per minute, one may not have the time to sift through on-line services and bulletin boards to find what one is looking for. The on-line service reduces the vast quantities of useless information on the Internet by offering a smaller set of services and bulletin boards found to be of interest to most people. However, the list of services is still very large and one is not confident which if any will be of interest. Furthermore, excellent information may be available on the Internet or elsewhere which the particular on-line service does not offer.

Bulletin boards may haphazardly provide specific information of interest. However, one must sift through answers which may or may not be of interest. Furthermore, one must find the bulletin board of interest; on the Internet there are a vast number which may or may not suit a person.

Expert systems are available which sift through information by use of algorithms, driven by rules and stored in a knowledge base. However, expert systems are expensive and time consuming to produce and maintain. It would be impossible to cover the vast and evolving information located on the Internet. Furthermore, the processing time required to run the expert systems would reduce the response time of these already slow servers considerably.

Another option is an heuristic database weighted by the usefulness response of clients. Patent number 5301314 to Gifford (1991) describes this method. The method consists of placing information which was determined useful within a category higher on the tree of offered information within the category. This method falls short in several ways. First, one must sift through the categories. Second, once in the category, one must sift through excellent answers until one finds the excellent answer which matches the question; the answer may not even be on the database or may be located in a different category. Third, people have differing interests even when the subject of a search is narrowly defined. For this reason the assumption made by prior art search engines that everyone is interested in the documents viewed by the majority often results in search results that are of little interest or value to the person conducting the search—therefore. In a category of movies, as an example, an excellent choice for an English Professor may be a poor choice to an engineer. Forth, what if one is not sure what categories may be of interest. There are millions on the Internet and thousands in subscriber services which may or may not suit a given person.

Another option is to provide trained personnel to search for information. This solution is expensive. Further, what is a good information to the personnel may not be to the person requesting the information. If the question is highly specialized in a given field, the personnel may not have the technical knowledge to find the appropriate information. Finally, searching even by a trained person, takes a considerable amount of time.

An intelligent computer based method to share information is needed which will reduce traffic on a networked system of computers and processing load on server machines. This method should offer the best information for a particular persons needs, whether that information is located locally on the server, is located on the Internet or is chosen from a set of responses on a bulletin board.

OBJECTS AND ADVANTAGES

It is, therefore, an object of the invention to provide a method of sharing information between client computers which will decrease the traffic on a network and decrease the load on a server machine.

It is another object of the invention for the server computer or the client computer to choose information which will optimally best serve the particular client's need.

It is another object of the invention to gather information from the Internet or other sources which will be of future value to clients and keep a database of that information or pointers to that information.

It is another object of the invention to provide an effective method of offering topics of interest to clients on an individual basis.

Still further objects and advantages will become apparent from a consideration of the ensuing description and accompanying drawings.

BRIEF DESCRIPTION OF THE DRAWINGS

FIG. 2 shows a client interface to the interest categories.

SUMMARY

A networked information sharing model is described comprising a client-server model or a client only model where there exists a shared information database, a shared category database, a shared interest profile database and a shared client enhancement database, each of which is continually and dynamically updated, the shared category database containing categories of interests, within which are weighted and marked information units, weights arrived at by empirical use and marks maintained to distinguish where the information came from and to access information according to client source preference. The shared interest profile contains a set of profiles which clients are associated with whereby useful client categories within profiles are offered when requested, a shared client enhancement list maintained to identify and weight useful sources of information and a client specific database maintained with client categories, preferred information sources, weights and weighted information access history whereby this database is used in conjunction with the shared databases to provide intelligent information sharing.

PREFERRED EMBODIMENT—DESCRIPTION

Figure 1:
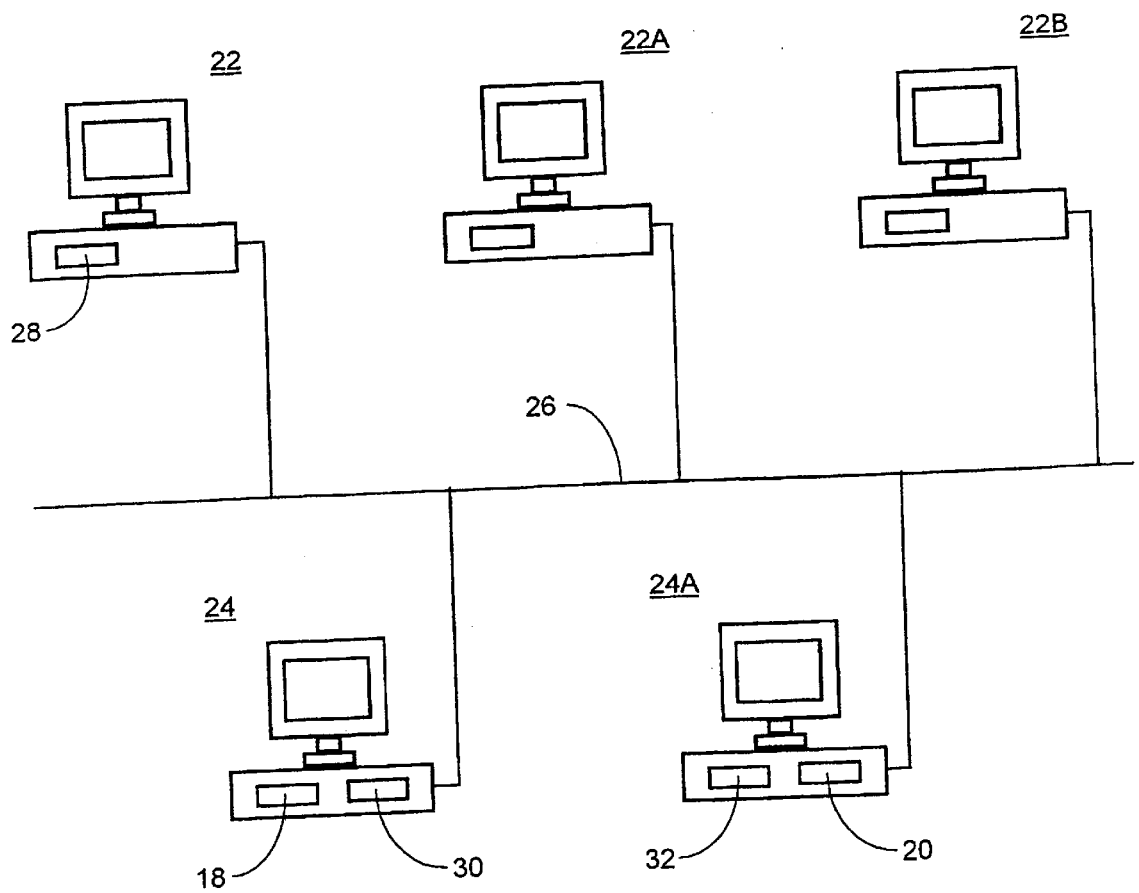
FIG. 1 shows a network of computers consisting of clients and servers which will share information.

FIG. 1 shows the preferred network structure of the invention. This consists of a set of clients who will share information over a communications link 26. There is a client database 28 containing a client index of interest categories and associated category choice information. There is one or more servers which contain a complete set of interest categories in the form of a complete category database 18. The interest category client database 28 is a subset of the complete category database 18. Server information database 20 consists of information or pointers to information. Information units pointing to information in server database 20 are kept for each category stored in complete category database 18. There is an interest profile database 32 containing a full set of interest profiles. Each client on the information network is assigned to one or more interest profiles. There is a client database enhancement list 30. This list contains each client and a number representing the amount of useful information from this client which was useful to other clients.

This invention offers a method of intelligently offering and deleting categories from interest client database 28, intelligently offering information within an interest category from information database 20 and judiciously gathering information for information database 20 for categories in complete category database 18. The following examples will clarify these activities.

As one example, client database 28 for client 22 may contain bulletin board interest categories of baseball player statistics, baseball game statistics and articles on current baseball teams. Another category may be offered to client 22 from server 24 of baseball stadium statistics. The decision to offer the category of baseball stadium statistics will be determined by artificial intelligence.

As another example, if a request for a prediction of what will occur in the next Yankee game is posted to the baseball game statistics interest category by client 22 which is run by server 24, server 24 may return a list of bulletin board answers prioritized based on which answer will most probably be best for client 22. The method by which server 24 prioritizes the answers for client 22 will occur without human intervention.

As another example, server 24 may judiciously gather pointers off the Internet of interesting articles on current baseball teams and store the pointers in information database 20 for the current baseball teams category located in complete category database 18. Client 22A may request three articles from the database. server 24 would offer what it thinks is the best two articles for client 22A. Again, the gathering of information and the offering occurs without human intervention.

FIG. 2 shows a user interface for current interest categories 36 and suggested interest categories 34. Each interest category is a node of an interest category tree. Child expanded node 38 shows node 3 with one level of children. If a client decides to get more specific than his assigned category he can view below the category. Parent expanded node 40 shows node 3 with two levels of parent nodes. If the client would like to view the more general categories above his assigned category he can view above his assigned category. As an example, node 3 may be backgammon. The three children of node 3 may be rules of backgammon, great backgammon players and backgammon strategy. The parents of backgammon may be board games and the grandparent may be leisure activities. The client may be assigned the backgammon node and may choose to view what categories are above or below him.

Figure 3:
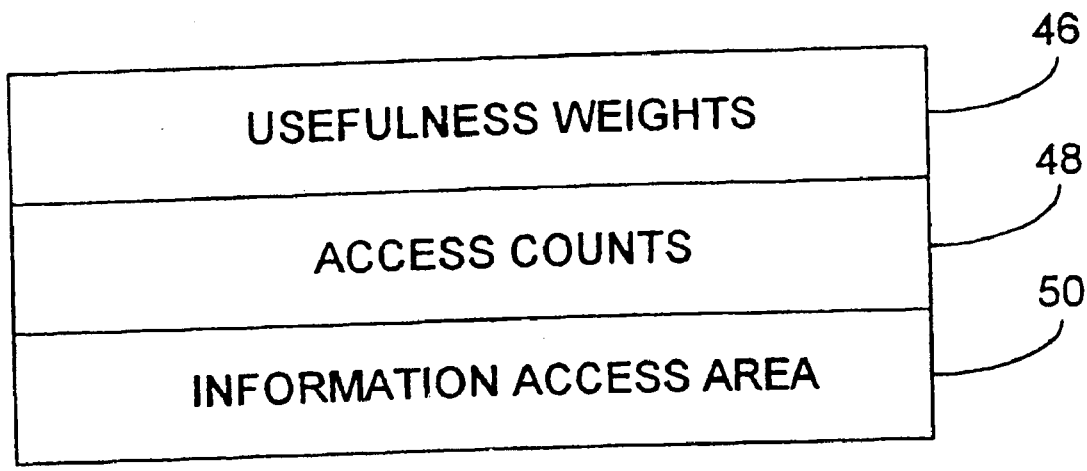
FIG. 3 shows the structure of an information unit.

The information database 20 of FIG. 1 is located on the server. It consists of information units, as shown in FIG. 3, containing an information access area 50 to access the information. The information may be located locally on the server or may be located remotely. Remote location can be anywhere outside of the given server. It contains a global information unit index 44 used by the client and the server to identify an information unit. It contains usefulness weights 46 which identify the usefulness of the information unit, access counts 48 which record the number of times the information unit has been accessed and an information access area 50 which is a method to get to the information or a pointer to a method to get to the information. The client fills these areas as he uses the information unit. The server accumulates client values and combines them to produce server values which are then stored in the information unit. There can be more than one count or weight since an information unit will have records of counts and weights for the given piece of information and the categories and server leading to that piece of information.

Figure 4:
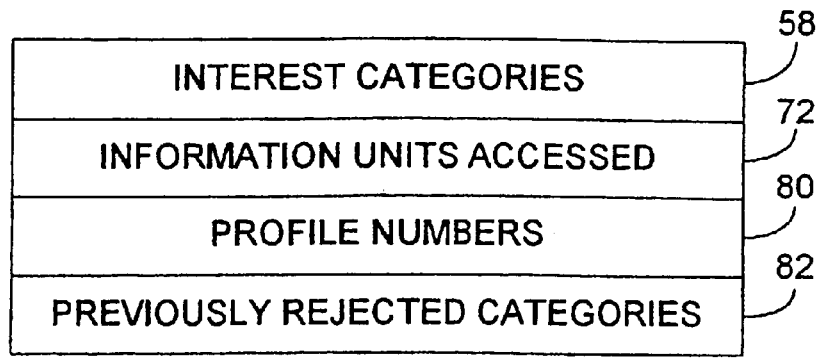
FIG. 4 shows the client database with an interest category and an information units accessed area.
Figure 4:
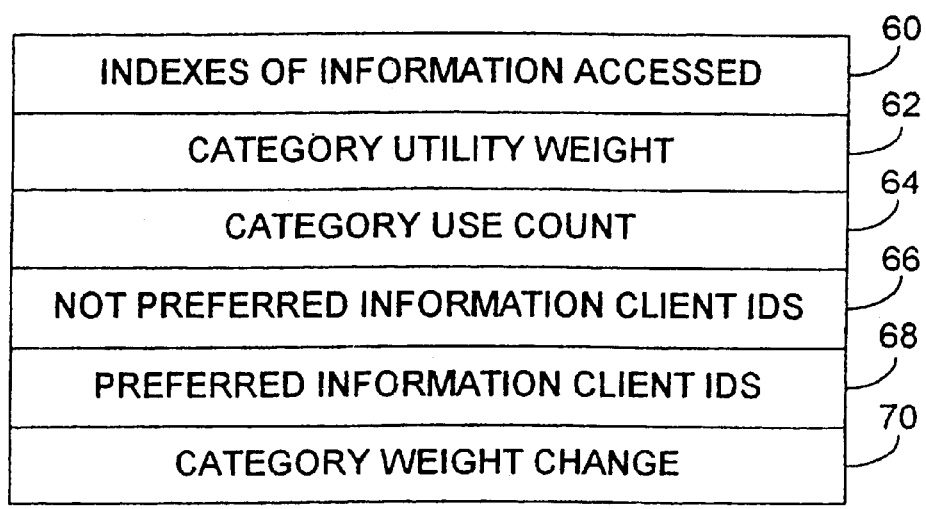
Figure 4:
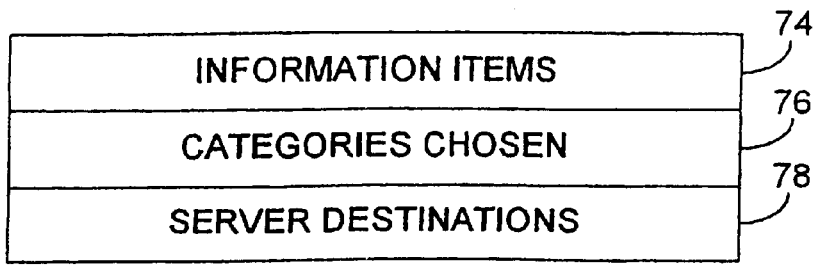

Referring now to FIG. 4, the client database 28A is located on the client. It contains an ordered list of client interest categories 58. Information is kept on each category. Indexes of information accessed 60 reflects information units which have already been accessed from this category. The category utility weight 62 is based on use and satisfaction with the use of the category. Category use count 64 is a count of the number of times this category has been used. Not preferred information client Ids 66 and preferred information client Ids 68 reflect encrypted Ids of other clients whose information this client has used. Information units accessed 80 for this category reflect all information accessed within the past arbitrary period of time (for example the past month). These units are given to the server for potential use by other clients. Profile numbers 81 associate this client with the interest profile database 32 of FIG. 1. Previously rejected categories 82 are maintained to be given to the server before requesting new categories of interest to this client.

By use of these structures an intelligent information sharing system is built across a network. The interaction between these structures allows for the transfer of useful information to meet a particular clients interests and needs.

PREFERRED EMBODIMENT—OPERATION

Figure 5:
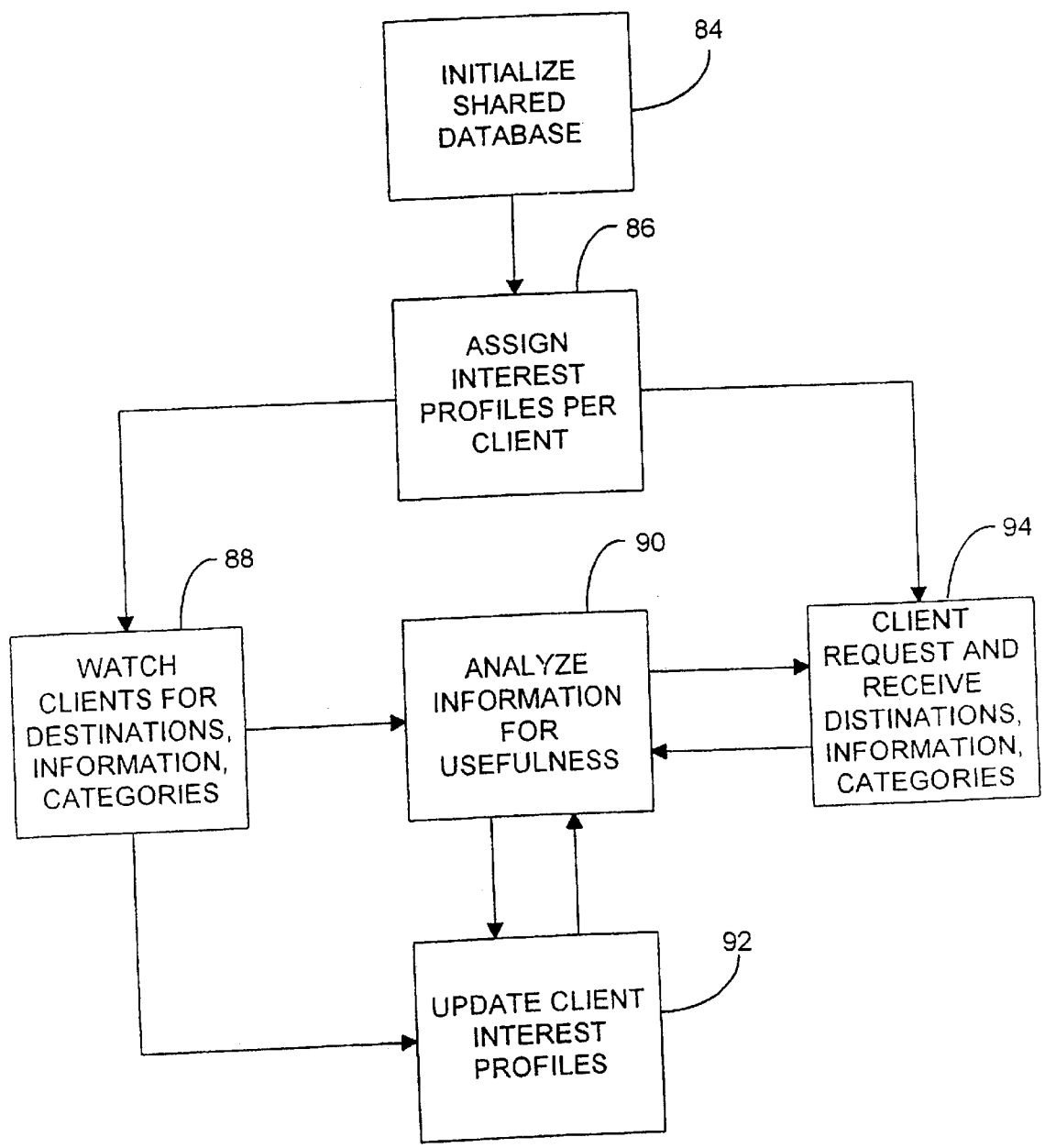
FIG. 5 shows the networked information sharing model.

The networked information sharing model is shown in FIG. 5. Objects described in FIGS. 1, 2, 3 and 4 will be referenced here and in subsequent paragraphs. In step 84 the shared information database 20 of FIG. 1 and the shared complete category database 18 of FIG. 1 are populated with information and cross references to that information. In step 86 client interest categories 58 of FIG. 4, which together are one profile, are assigned to each client; this profile of categories is matched to one or more generic profiles in shared interest profile database 32 of FIG. 1. In step 88 clients are watched by the client machine; referring to FIG. 4, information on server destinations 78, information items 74 and categories chosen 76 are recorded on the client database 28A in the Information Units Accessed 80 table. In step 90 information and destinations accessed by the client are recorded with usefulness weights 46 of FIG. 3 and access counts 48 of FIG. 3 within each information unit on the server in shared complete category database 18 of FIG. 1. In step 92 the clients interest category profile assignments in shared interest profile database 32 of FIG. 1 are updated according to the current category profile information recorded in step 88. The client requests specific pieces of information, server or database destinations and new categories in step 94; with the shared interest profile database 32 of FIG. 1 updated in step 92 and the analysis done in step 90, data is returned to the client.

Referring back to FIG. 1, the server information database 20 and the complete category database 18 is initially populated by standard information collection. On-line services have category directories and information databases. Many books can be found with categorized directories of on-line services. Thus, we begin with a good base of information database 20 cross referenced through complete category database 18. The complete category database 18 contains leaf nodes and non leaf nodes, each representing an interest category. Clients will be assigned to interest category nodes. Referring now to FIG. 4, this information will be kept in the client database 28A as client interest categories 58. Clients will also be assigned a set of profile numbers 81 which will associate them with interest profiles located in the interest profile database 32 of FIG. 1. Profiles and interest categories will be initially assigned by use of an interest survey prepared by a marketing and/or psychology group. Subgroups within an interest category can be formed where interest in information within a category will differ substantially between one client and another. Subsequent updates will be made dynamically by the intelligence within the client and server computers as described below.

The client machine watches where the client goes to access information and what information he accesses. Privacy is of course imperative. Perhaps, the client can turn on or off the watch facility by pressing a button on the display. The client would also have an encrypted and private client ID. Perhaps, at the end of an information search the client can press a share button to allow the sharing of the information with other clients.

A script is kept which when launched leads to the information. The computer keeps track of how often the information site and the nodes leading to the information site is accessed; it prompts the user at the end of the information for a usefulness weight from excellent to poor. The computer keeps track of how often each point leading to the final information is accessed. The script leading to the information in the information access area 50 of FIG. 3, the access counts 48 of FIG. 3 and the usefulness weights 46 of FIG. 3 are kept within the information unit structure which is passed between client database 28A of FIG. 4 and server complete category database 18 of FIG. 1. These information units point to the information database 20 of FIG. 1 through the information access area 50 of FIG. 3.

Figure 6:
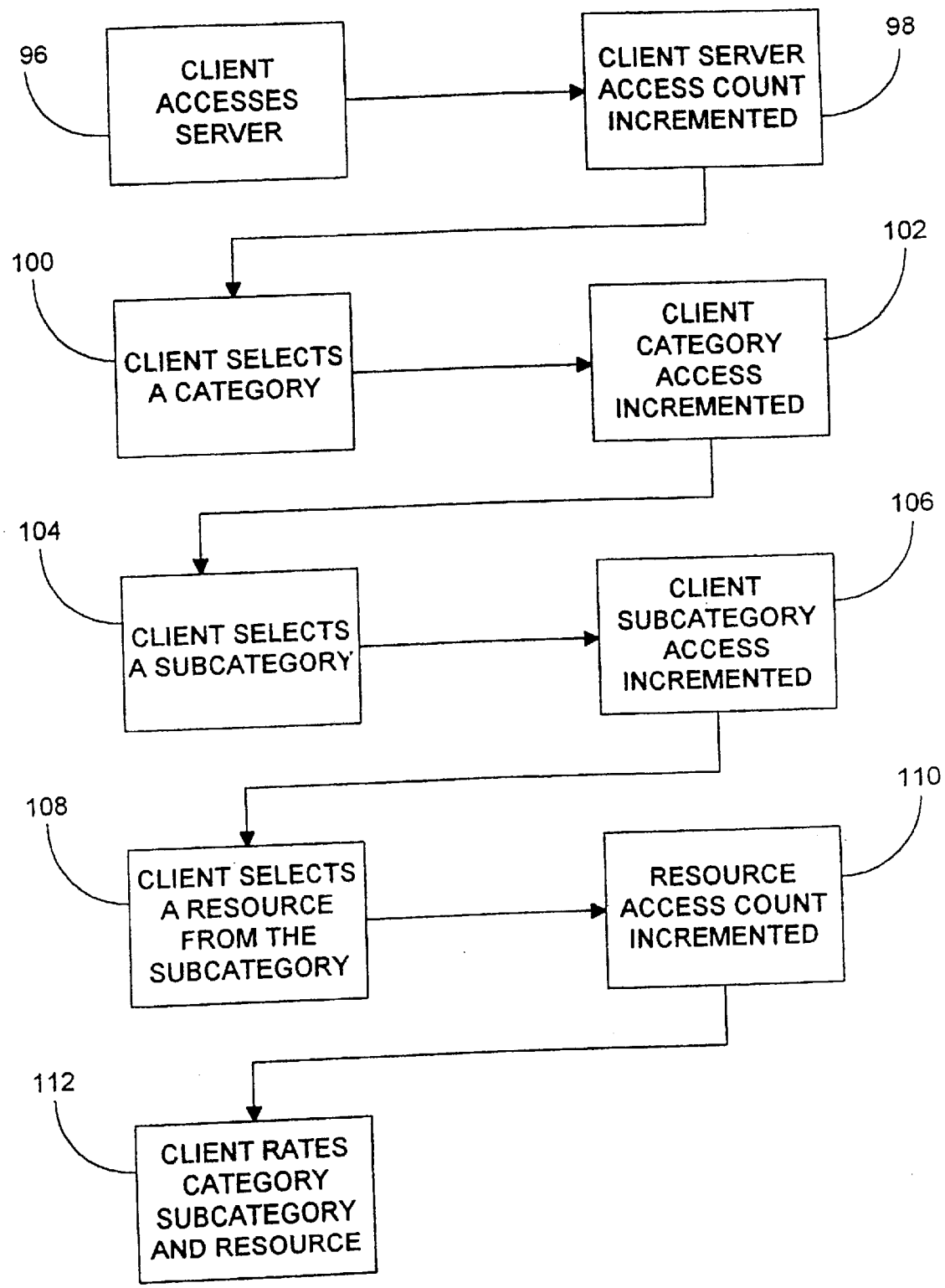
FIG. 6 shows the recording of an information access by a client

FIG. 6 details the process of recording information access by a client. Let us call this client Client A. In step 96 client A accesses an information server, as an example the Hall of Malls server; in step 98 the client computer increments the count of how often client A has accessed the Hall of Malls server. In step 100 the client selects a category, as an example the Florida Mall; the computer increments the count for Florida Mall for client A in step 102. Client A goes to The Unusual Music Store subcategory in step 104; the computer increments the count for The Unusual Music Store in step 106. In step 108 the client chooses a resource, in this example a tape called The Nighffly; the computer increments the count for this resource, the Nighffly tape, in step 110. In step 112 the client rates each node in this access: the Hall of Malls, the Florida Mall, the Unusual Music Store and The Nighffly. The client computer records this information in the usefulness weights 46 of FIG. 3 and access counts 48 of FIG. 3 of the information unit index 44 of FIG. 3.

Figure 7:
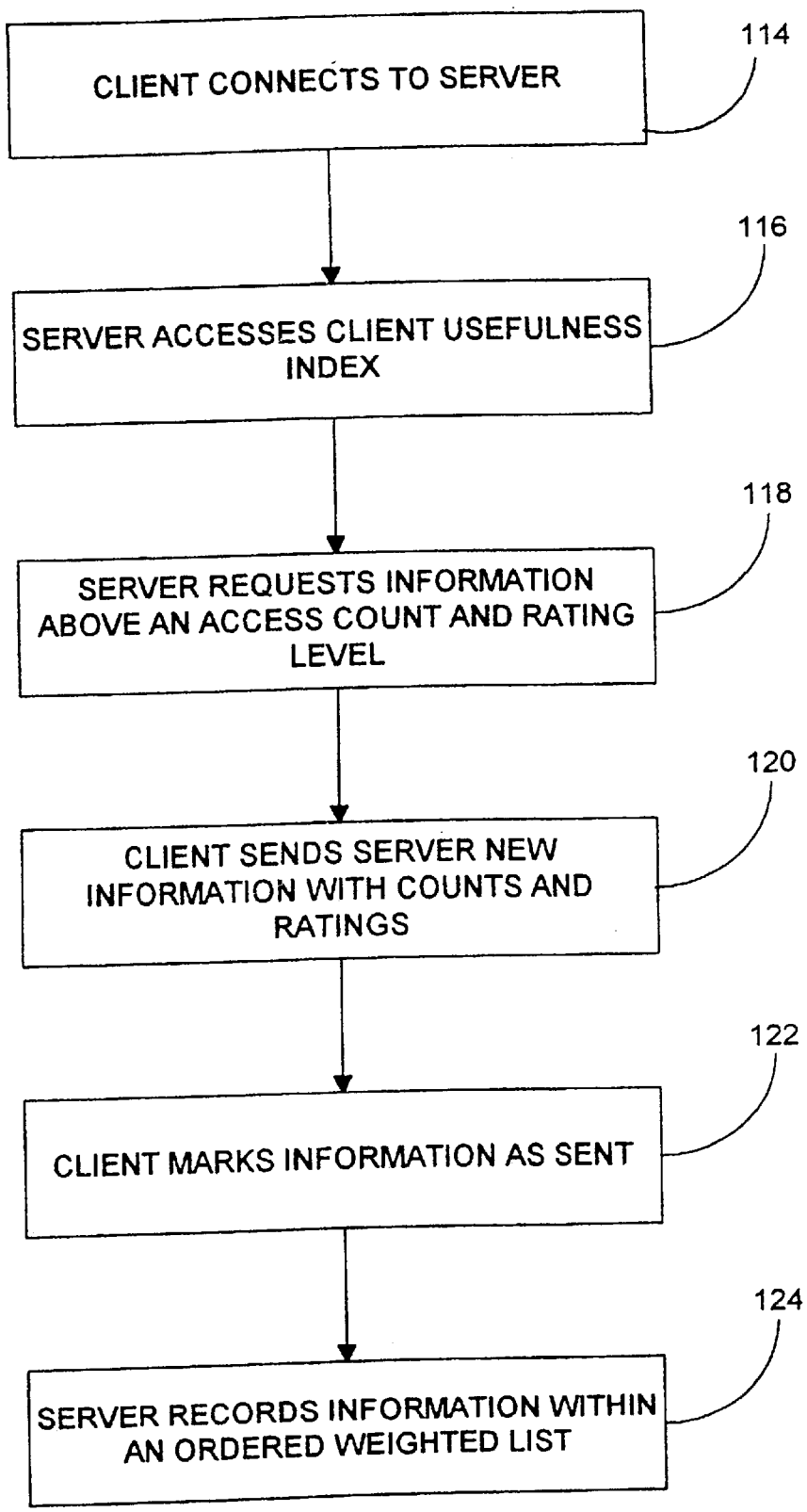
FIG. 7 shows the upload and processing of client information to a server.

If client A has a history of giving good information to other clients, then the information unit is recorded by the server. FIG. 7 details this method. In step 114 the client connects to the server. In step 116 the server accesses the client usefulness index from enhancement database 30. This index is an historic measurement of how useful information offered by this client has been to other clients; it is based on the number of users accessing the information who were satisfied with the information. In step 118 the server requests information from the client which has a use count above a particular number and/or a rating above a particular number; the count and rating number are lower for a high client usefulness index and higher for a low client usefulness index. In step 120 the client sends the server the information with counts and ratings. In step 122 the client records this information as sent; subsequent uploads will only resend this information if counts or ratings have changed substantially and will only send the deltas of the information. In step 124 the server records the information unit within an ordered weighted list.

Figure 8:
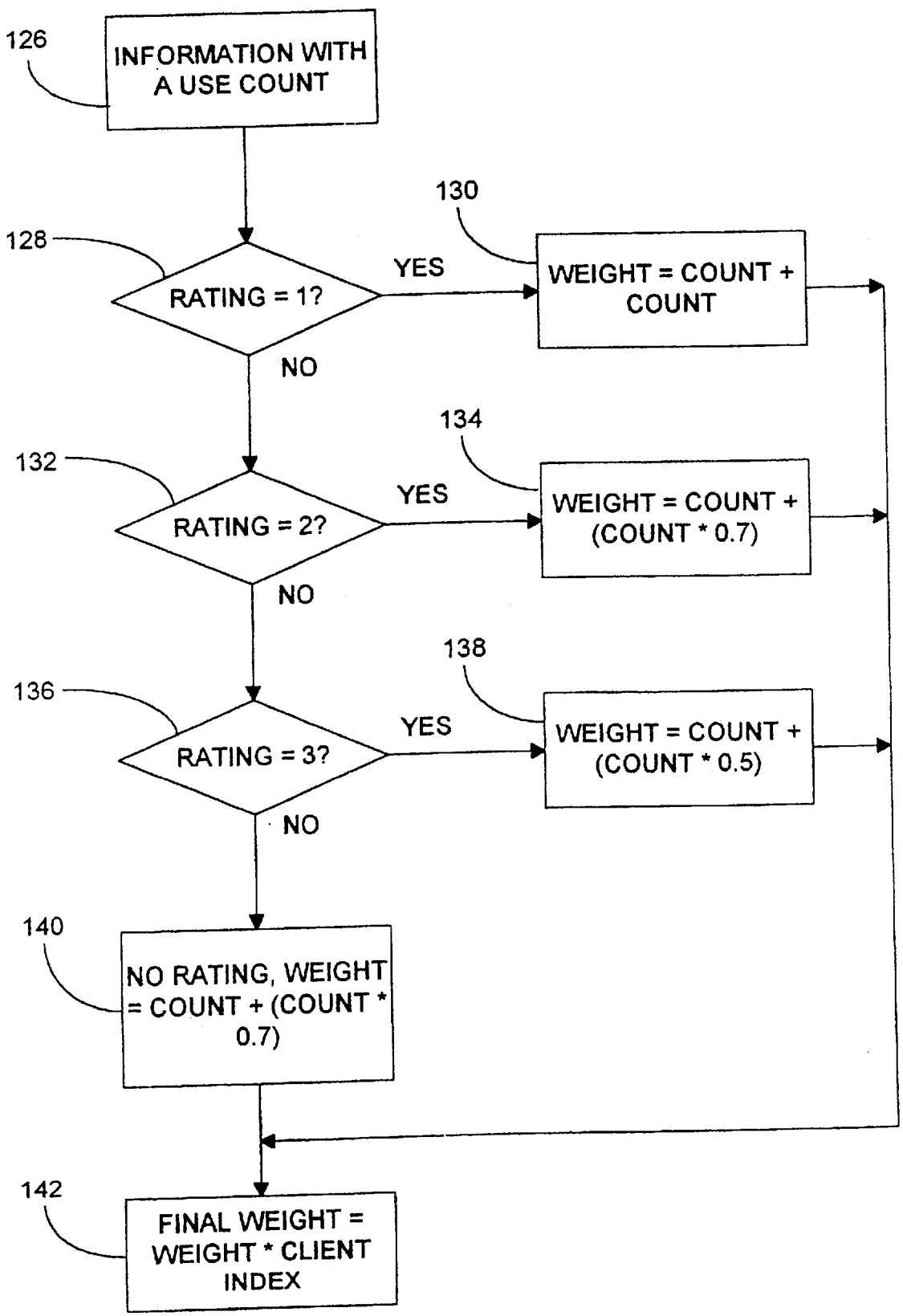
FIG. 8 shows a method of calculating a client information weight.

FIG. 8 gives a method for weighting information received by a client. It uses a rating index of 1, 2 or 3. This method is for information which has a count greater than or equal to one, as an example the Hall of Malls destination information unit. In step 126 the information with a use count is received. If, in step 128, the rating is 1 (the top rating) then in step 130, the weight is assigned two times the count. If, in step 132, the rating is 2 then in step 134 the weight is assigned 1.7 times the count. If, in step 136, the rating is 3 then in step 138 the weight is assigned 1.5 times the count. If, in step 140, there is no rating then the weight is assigned 1.7 times the count. In step 142 the weight is assigned whatever the current weight is times the client data usefulness index. This method takes into account three factors: the historic usefulness of the clients data, the number of times the data was reused and the rated satisfaction when using the information.

Referring back to FIG. 1, If the information is accessed through a category in complete category database 18, the information is shared with clients in this category. If the information was not accessed through a category it can be offered to clients with a similar interest profile accessed from the interest profile database 32; if the information is not categorized and turns out to be useful to a number of clients, a question can be asked of each client as to which category it belongs in. If one or more categories consistently comes up, the information unit can be placed for access within a given category. Otherwise the information can be placed in a catch all generic category.

Figure 9:
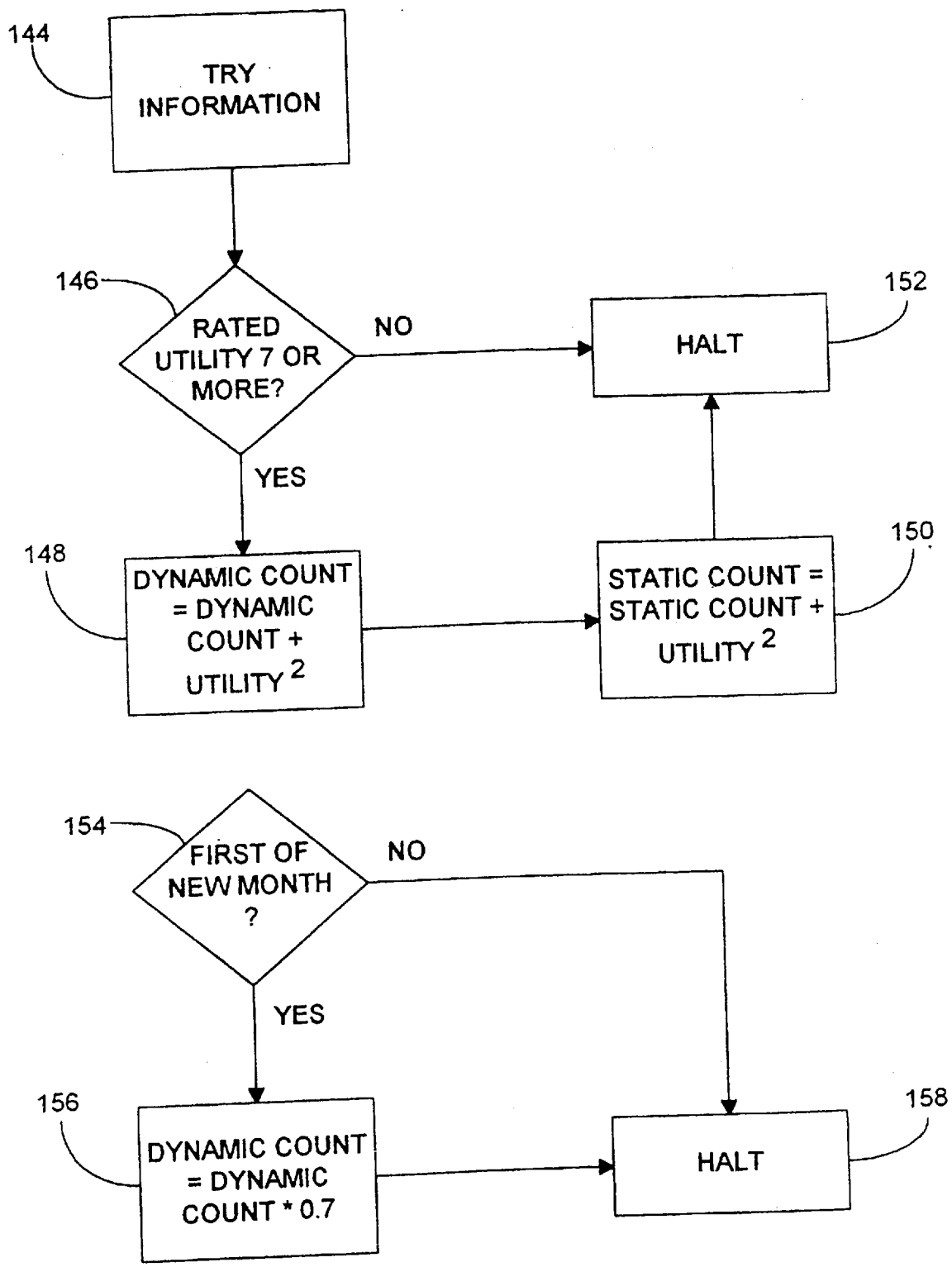
FIG. 9 shows a method of weighting information used by clients from a server.

FIG. 9 gives a method for keeping a dynamic and a static utility count for a given piece of information received by a server from a client. In step 144 the information is tried by a client. If, in step 146, the information is rated as 7 or more on a 1 to 10 scale then in step 148 the new dynamic count is assigned the old current dynamic count plus the utility rating squared; the static count in step 150 is likewise updated. The static count gives total utility of this item since its inception. The dynamic utility count gives a current utility weight. This is done by reducing the past utility weight with time, thus requiring continual usefulness of the information. In step 154, if the date is the first of the month, then in step 156 the dynamic count weight is reduced by a factor of 0.3, otherwise no action is taken 158.

The same type of method can be used to continually populate a bulletin board containing baseball articles. Users would offer interesting articles. The information stored in server information database 20 of FIG. 1 would contain a pointer to the article on the Internet or in the service provider database. An information unit pointing to the information in information database 20 of FIG. 1 would be kept in the baseball articles category in complete category database 18 of FIG. 1. Access counts 48 of FIG. 3 and usefulness weights 46 of FIG. 3 of each article would be kept in the corresponding information units. The enhancement database 30 of FIG. 1 is kept up to date with the private user ID, the category if any and the information offered counts.

Figure 10:
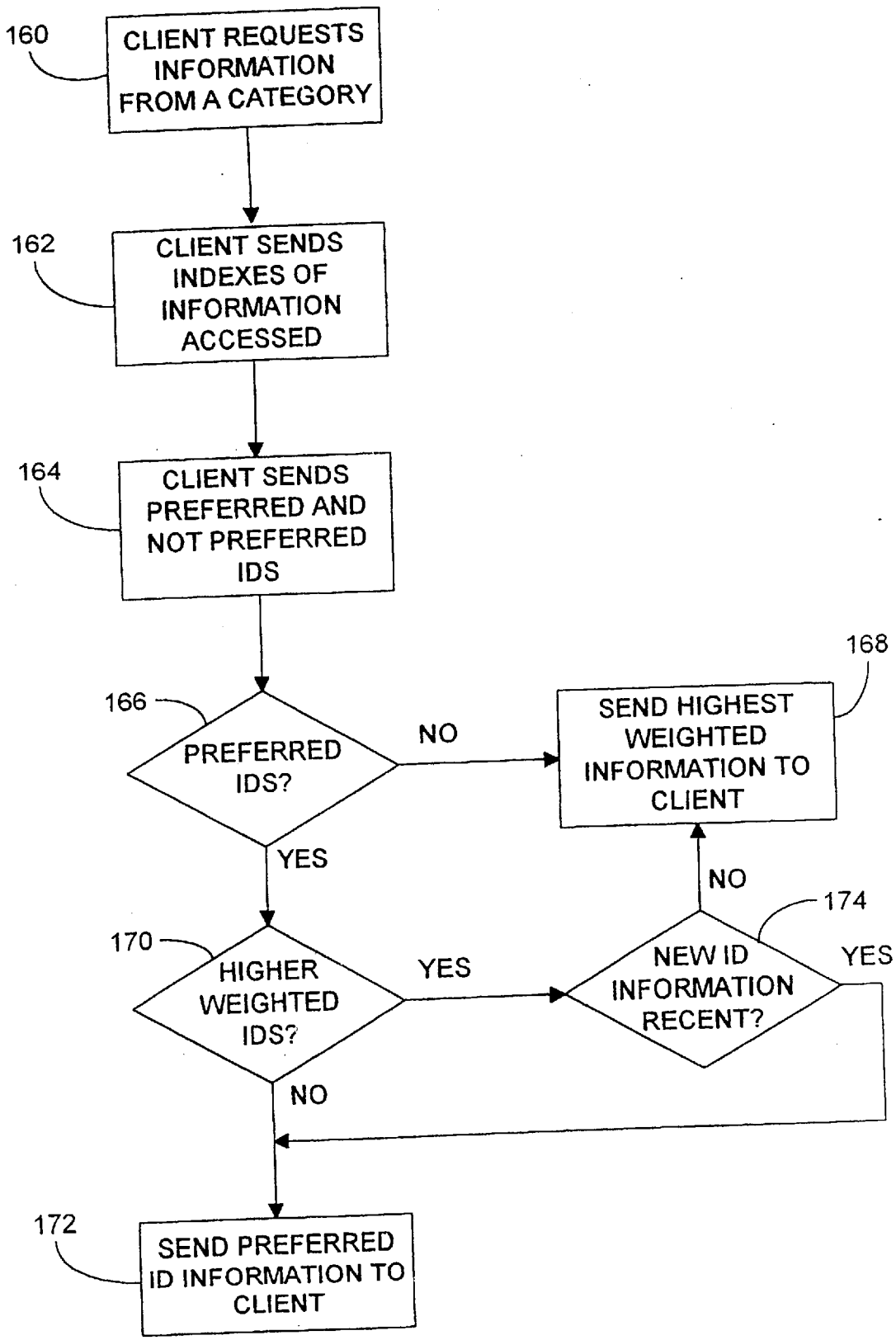
FIG. 10 is a model showing the intelligent retrieval of requested information.

Referring back to FIG. 4, the client database 28A contains the client interest categories 58. Beneath a given category, there is a preferred information client IDs 68 and a not preferred information client IDs 66 containing encrypted, private Ids of other clients whose information was useful. From this list the server chooses articles to offer by finding offered articles from clients who are on the preferred information client IDs 68. FIG. 10 demonstrates this method. In step 160 the client requests information from a category. In step 162 the client sends indexes of information already accessed 60 of FIG. 4. In step 164 the client sends encrypted preferred information client IDs 68 of FIG. 4 of historically preferred providers and those providers who were not preferred information client IDs 66 of FIG. 4. If, in step 166, if information is available from a preferred provider, if there is no higher weighted information from a new provider in step 170, then in step 172 the preferred provider information is sent to the client. If, in step 170 there is higher weighted information from a new provider, if, in step 174 new provider information has been sent within the last three accesses, then in step 172 the preferred provider information is sent to the client. If, in step 174, new information has not been sent within the last three accesses, then in step 168 the information from the new provider is sent to the client. This method offers information from historically useful providers for this client. This method distinguishes between clients within a category. This becomes particularly useful where there is a range of tastes within a category, for example with movies, magazines, restaurants and music. The method also provides for sampling new providers as seen in step 174.

Where there is a large database which is heavily used, the enhancement database 30 of FIG. 1 and the local preferred information client IDs 68 of FIG. 4 can be used effectively. As an example, the Archie server is a librarian for the Internet and can be searched for sources. By adding a bulletin board, users can post questions or search for them. Clients who answer the most posted questions with the least average search time can be given more time slices on the Archie server. Thus, slow and or inexperienced Archie users do not waste time on the server. Furthermore, they receive sources which may well be better than if they had searched Archie. Further, rather than a huge list which must be transferred over the Internet, a potentially small list is returned via the bulletin board. Thus, the server load is reduced and users get quality information.

Figure 11:
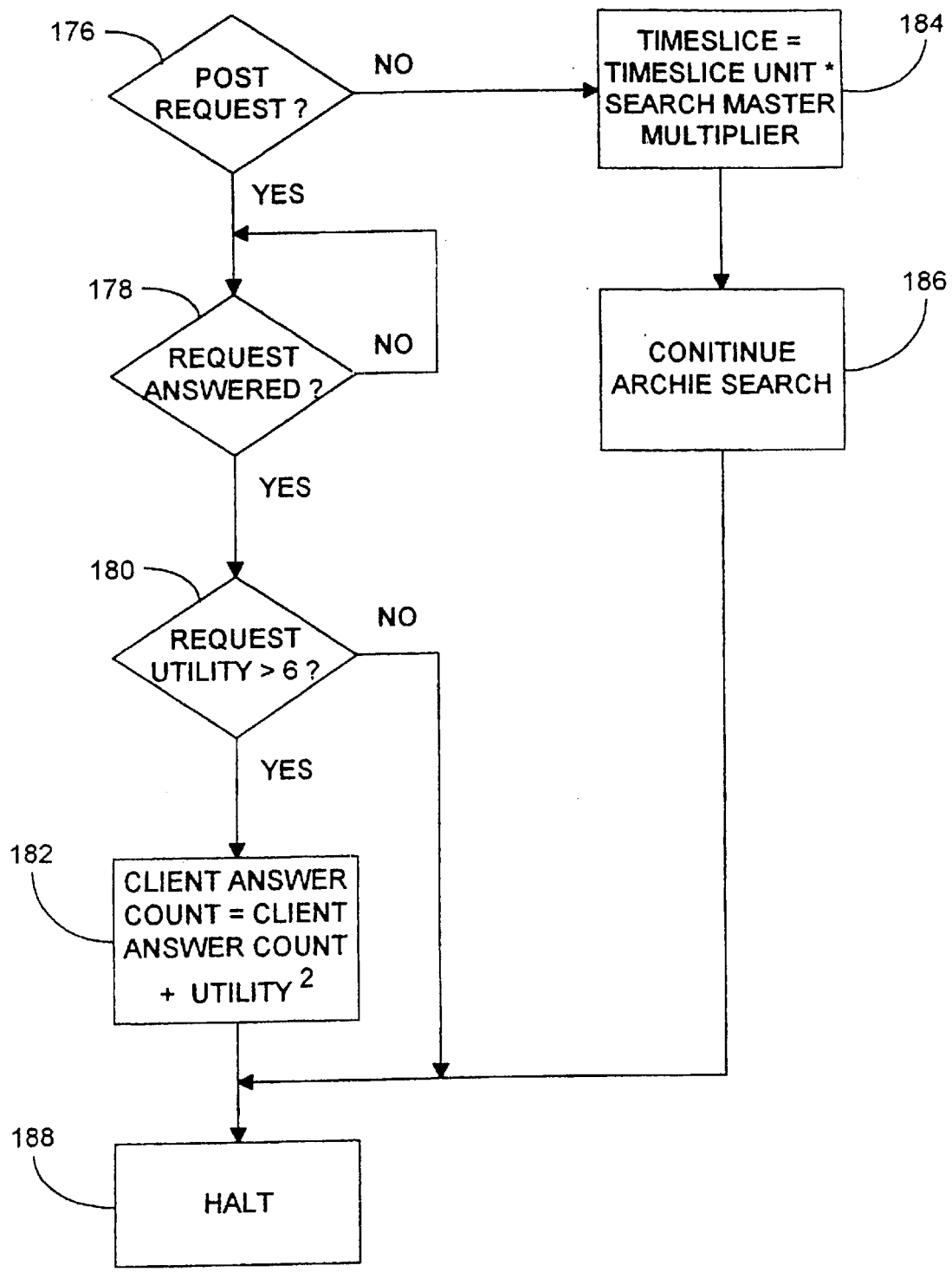
FIG. 11 is a model for a database which can be searched in or posted to for information.

FIG. 11 gives a method for a bulletin board and database which can be searched. If client A posts a request in step 176 and an answer is given back by client B in step 178 then if in step 180 Client A rates the information as 7 or more in utility then the client B answer count is incremented by the Client A utility rating squared in step 182. If client B chooses not to post a question in step 176 then, in step 184, he is given a timeslice equal to the minimum timeslice unit times his search master multiplier. The search master multiplier is determined by the current load on the server and client Bs client answer count. In step 186 the search begins.

Referring now back to FIG. 1, the interest profile database 32 is dynamically updated according to the client interest categories 58 of FIG. 4 and their associated category utility weight 62 of FIG. 4 contained in the client database 28A of FIG. 4. Thus, a client which was placed in sports and music categories may become engrossed in an accounting job requiring information about the economy and stocks; he may, therefore, become associated to a different set of interest profile categories in interest profile database 32.

Figure 12:
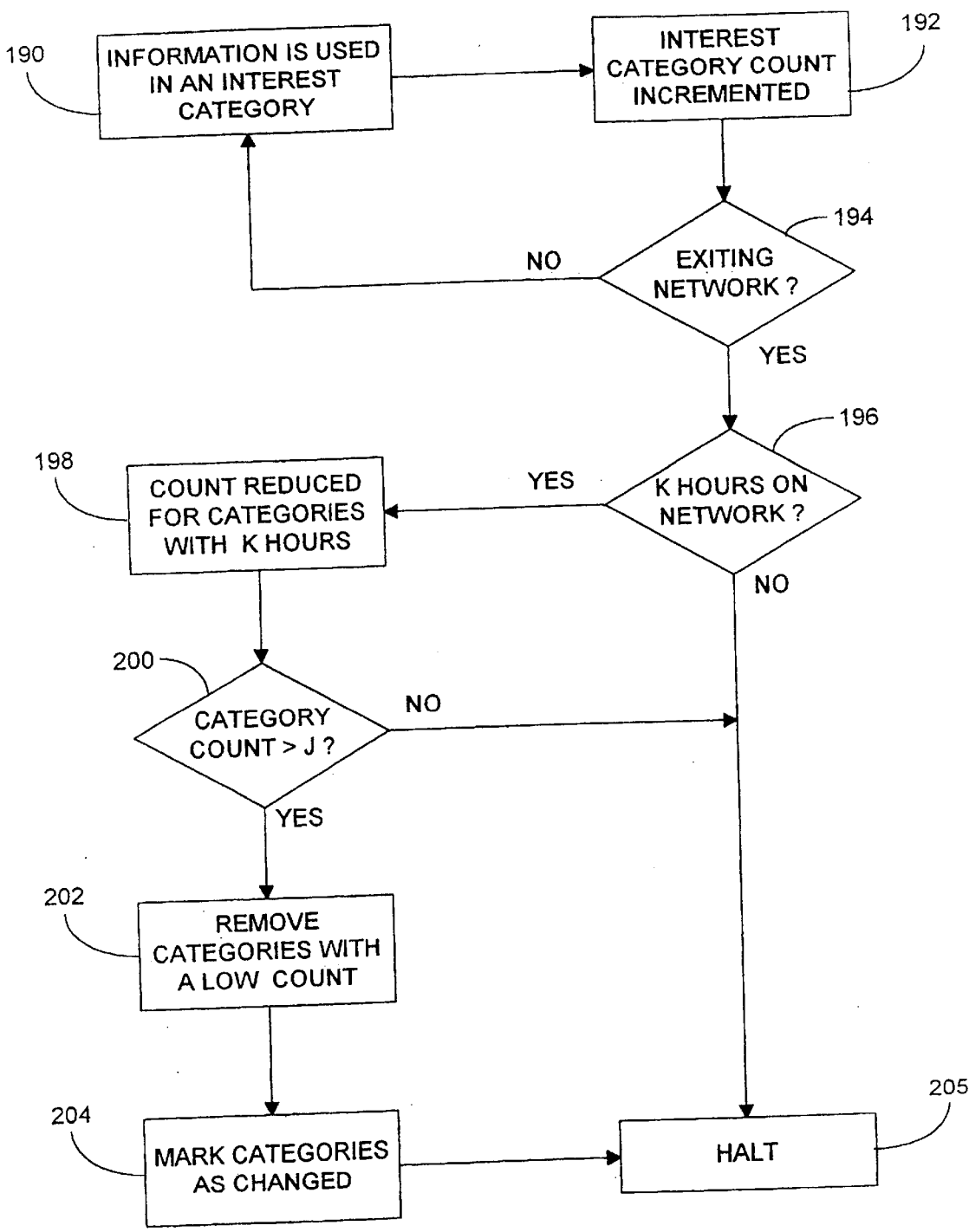
FIG. 12 shows the intelligent update of a client category list on the client database.

FIG. 12 offers a method of dynamically updating client interest categories 58 of FIG. 4. In step 176 information is used in an interest category. In step 178 the interest category count 64 of FIG. 4 is incremented by 1. If the user is exiting from the service provider in step 180, if in step 182 the user has been on the network a given number of hours K (for example 40 hours) since last updating his interest category profile then in step 184 his interest category profile on client database 28A of FIG. 4 is updated. For all categories which have not been checked in K hours of on-line use, the interest category count 64 of FIG. 4 is reduced by a factor of 0.3. In step 186, if the number of interest categories is greater than a given constant J (for example 20), categories are removed from the current interests category 36 of FIG. 2 directory with an interest count less than a given number L(for example 20 for a scale between 0 and 100) in step 188; perhaps removed categories are placed in an unused interest category directory for subsequent purging by the client. In step 190 the category weight change Boolean 70 of FIG. 4 is set to TRUE. This value will be used by the server to update the client on interest profile database 32 of FIG. 1. This method provides a dynamically updated client interest profile.

The profile directory is particularly useful in offering new categories of interest. By noting categories not on Client A but often used by other clients within the interest profile, offers can be made to client A of new categories he has not tried. Not categorized but new and enjoyable services used by members in the interest profile can be offered to clients as well.

Figure 13:
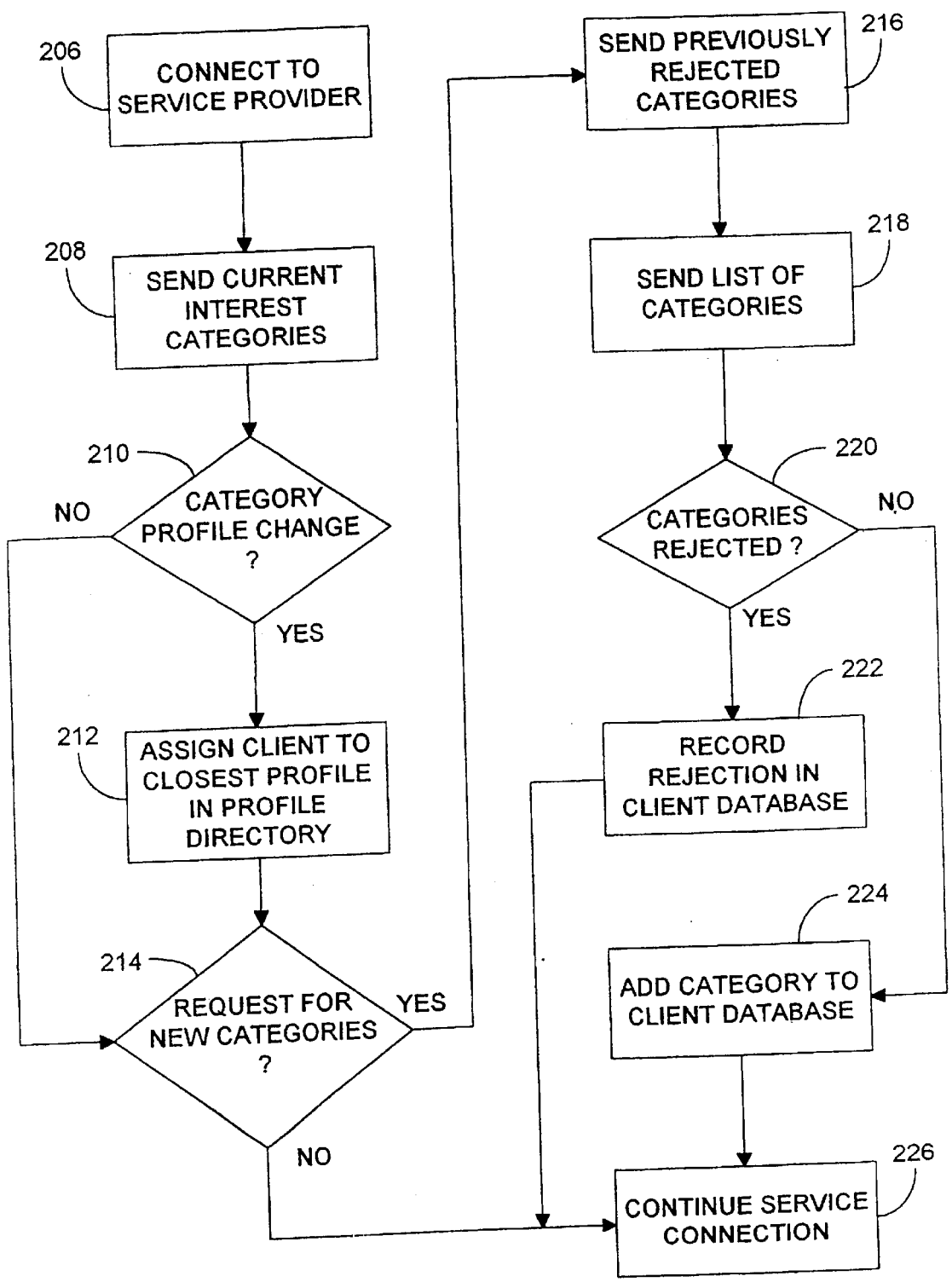
FIG. 13 shows the intelligent update of the server interest profile list and the intelligent offer of new categories.

FIG. 13 demonstrates a method of offering categories and services based on an interest profile. In step 192 the client connects to the service provider. In step 194, the client interest categories 58 of FIG. 4 of the client database 28A of FIG. 4 is retrieved. In step 196, if the category weight change Boolean 70 of FIG. 4 is TRUE, in step 198 the server interest profile database 32 of FIG. 1 is updated to identify the client with the closest interest profiles on the server. In step 200, if there is a request for a new category, then in step 202 the client sends previously rejected categories 82 of FIG. 4. In step 204 the client is sent an ordered list of not rejected, most used and enjoyed categories within his interest profile database 32 of FIG. 1. If the client explicitly rejects a category in step 204, then in step 206 this is recorded in his local client database 28A of FIG. 1. In step 210 the client adds any categories he would like to try. Likewise, specific services can be offered to a client based on other clients within his interest profile database 32 of FIG. 1. This offers the client a simple and effective method of acquiring new information and categories of interest.

Thus, a method using machine based intelligence to share information and interests over a network of computers has been described. The method includes client databases of interests and information and processing of that data. The benefits include information retrieval specific to a clients needs, reduced traffic and CPU time for searching databases, client information stored on client machines reducing non-volatile disk memory requirements on the server, client preprocessing on client machines reducing the cost of analyzing and distributing information on the server and interactive useful information storage in locations where intelligence exists to distribute that information.

While the invention has been illustrated in connection with a preferred embodiment, it should be understood that many variations will occur to those of ordinary skill in the art, and that the scope of the invention is defined only by the claims appended hereto and equivalent.

OTHER EMBODIMENTS CLIENT INFORMATION SHARING WITHOUT A SERVER—DESCRIPTION

Figure 14:
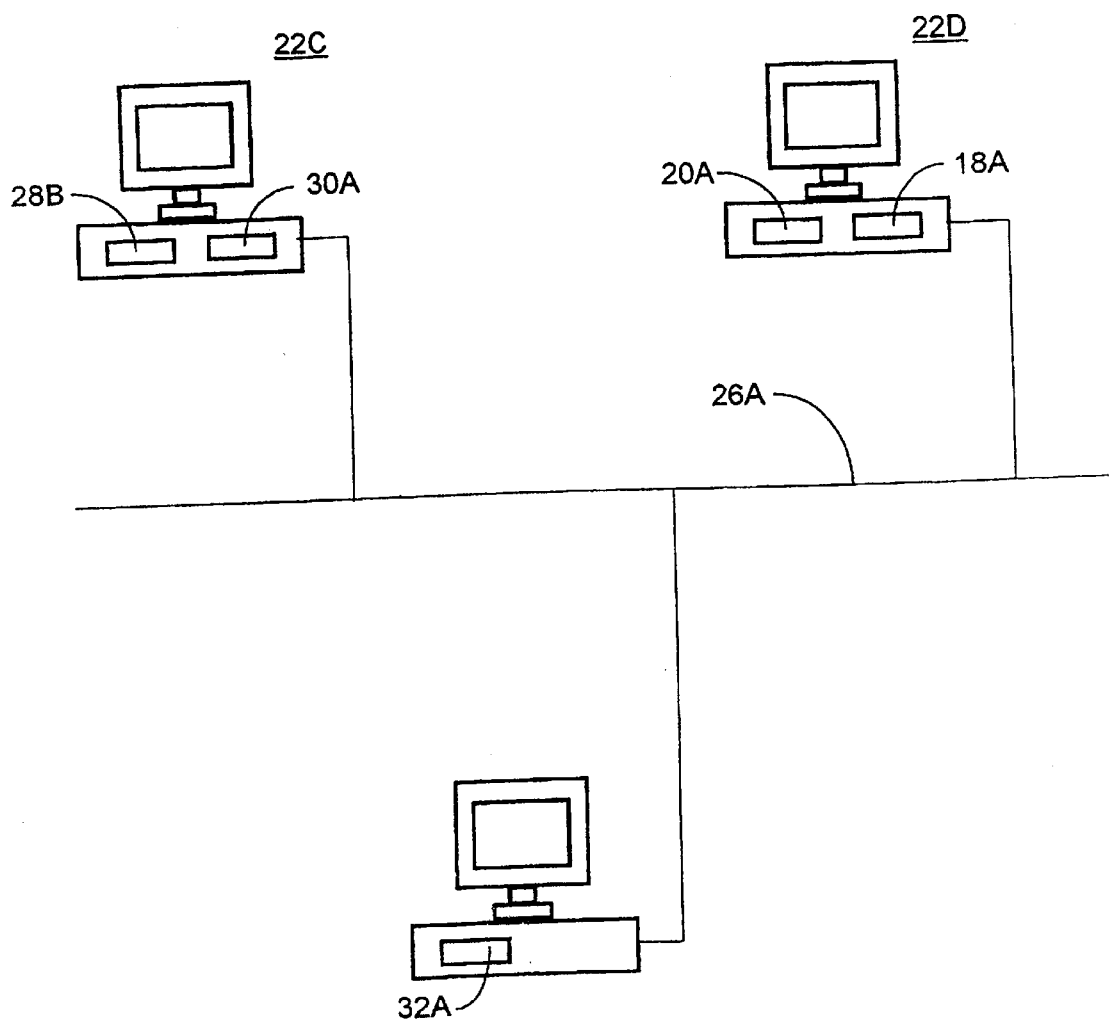
FIG. 14 shows a networked information sharing model consisting only of clients.

FIG. 14 shows an alternate network structure of the invention. This consists of a set of clients who will share information over a communications link 12A without a server. There is a client database 14B containing a client index of interest categories and associated category choice information. There is a unique client database 14B on each client. There is a client shared database containing a complete set of interest categories in the form of a complete category database 18A. The database can be mirrored on several clients and can be distributed over a number of clients. At least one full copy of the database should be accessible to all other clients at all times. The interest category client database 14B is a subset of the complete category database 18A. Information database 20A is shared by all clients and consists of information or pointers to information for each category stored in complete category database 18A. Information database 20A can be mirrored and distributed across a number of clients. One full copy should be accessible at all times. The interest profile database 32A and client database enhancement list 30A is likewise a shared client database and can be mirrored and distributed. One full copy should be accessible at all times.

Processing formally done by the server is now done by each client using the shared complete category database 18A and the shared information database 20A.

CLIENT INFORMATION SHARING WITHOUT A SERVER—OPERATION

The networked information sharing model is shown in FIG. 5. Objects described in FIGS. 14, 2 and 4 will be referenced in this discussion. Referring to FIG. 5, in step 84 the shared information database 20A of FIG. 14 and the shared complete category database 18A of FIG. 14 are populated with information and cross references to that information. In step 86 client interest categories 82 of FIG. 4, which together are one profile, are assigned to each client; this profile of categories is matched to one or more generic profiles in shared interest profile database 32A of FIG. 14. In step 88 clients are watched by the client machine; referring to FIG. 4, information on server destinations 78, information items 74 and categories chosen 76 are recorded on the client database 14A in the Information Units Accessed 58 table. In step 90 information and destinations accessed by the client are recorded with usefulness weights 46 of FIG. 2 and access counts 48 of FIG. 2 within each information unit on the server in shared complete category database 18A of FIG. 14. In step 92 the clients interest category profile assignments in shared interest profile database 32A of FIG. 14 are updated according to the current category profile information recorded in step 88. The client requests specific pieces of information, server or database destinations and new categories in step 94; with the shared interest profile database 32A of FIG. 14 updated in step 92 and the analysis done in step 90, data is returned to the client.

Actions taken by the server in the preferred embodiment are now implemented by the client.

CONCLUSIONS, RAMIFICATIONS, AND SCOPE

Accordingly, it can be seen that a networked information sharing system can intelligently distribute and gather information for a group of clients. Clients have a wide range of interests and skill levels. By dividing clients into category profiles and dynamically matching clients to sources of information, high quality information sharing is achieved. An intelligent means of information sharing can grow the skills, productivity and personal interests of clients. In addition, by filtering less useful information and obviating slow and massive searches, the percentage of useful information flowing across the bandwidth of the network increases. By offering information to the client rather than necessitating the client to search for himself, clients without computer expertise can enjoy and benefit from the advantages of information distributed across a disperse network of servers.

Although the description above contains many specificities, these should not be construed as limiting the scope of the invention but as merely providing illustrations of some of the presently preferred embodiments of this invention. Various other embodiments and ramifications are possible within it's scope.

Thus the scope of the invention should be determined by the appended claims and their legal equivalents, rather than by the examples given.

What is claimed is:

1. In a system where information is stored in at least one database on at least one computer system, a method for sharing said information responsive to a search request by a search client comprising the steps of:

maintaining a database of a plurality of information units identifying the location of information on said computer system;

maintaining a list of clients associated with each of said plurality of information units, said list of clients comprising a plurality of clients who have previously provided a utility weight for said information identified by said information units;

maintaining a history list of clients who have previously offered useful information for said search client, said history list associated with said search client;

associating said search client with at least one of said plurality of clients on said history list of clients;

cross-referencing clients on said list of clients who have previously provided said utility weight for said information with said history list of clients to select information responsive to said search request;

providing to said search client, said responsive information.

2. The method of claim 1 further comprising the step of providing information responsive to said request having the highest utility weight.

3. The method of claim 2 further comprising the step of providing to said search client an ordered list of categories related to said request for information.

4. The method of claim 3 wherein said step of providing said ordered list of said categories further comprises the step of associating said utility weight factor with said categories of information.

5. The method of claim 1 further comprising the step of obtaining from said search client a utility weighting of said information for addition to said list of clients.

6. The method of claim 1 wherein said associating step further comprise the steps of:

determining the number of times said information is accessed; and associating said access number with a client utility rating, said client utility rating derived from use and utility ratings based on use by said plurality of clients having a common information preference.

7. In a computer network system where information is distributed among a plurality of distributed computers coupled to said network, a method of accessing information over said network by a search client associated with one of said distributed computers, said method comprising the steps of:

generating a request for information by said search client;

maintaining a history list of clients who have previously offered useful information for said search client;

identifying clients on said history list of clients who have previously provided a utility weight for information responsive to said request for information;

associating said search client with at least one of said identified clients on said history list of clients;

selecting responsive information based on said associating step; and providing a ranked set of information in response to said request for information, said ranking based on said utility weight supplied by at least one of said clients on said history list of clients in response to said associating and selecting steps.

8. The method of claim 1 wherein said providing step further comprises the step of updating a category utility weight to reflect use and utility of said use during a selected period of time.

9. The method of claim 1 wherein said providing step further comprises the steps of:

identifying clients having a history of offering information of high utility to other clients; and allocating access bandwidth to said network to said identified clients such that said identified clients are allocated an amount of access bandwidth greater than proportional bandwidth.

10. The method of claim 9 wherein said access allocation comprises the steps of:

assigning a weight to selected ones of said plurality of clients when said information is deemed useful by clients accessing said information; and allocating a proportion of available bandwidth to clients having a weight indicating a history of providing useful information.

11. The method of claim 7 wherein said clients on said history list have previously provided a utility weight for said information to select the most relevant information to be provided to said search client.

12. In a distributed network computer system, a method for efficiently sharing information in response to a request for information from a search client comprising the steps of:

performing a search by said search client comprising the steps of:

maintaining a database of a plurality of information units identifying the location of information accessible over said network computer system;

maintaining a list of clients associated with each of said plurality of information units and a utility weight for said information identified by said information units;

associating each search client with at least one of said clients on said list of clients;

providing information units responsive to the request for information to said search client, said information units having a utility weight indicative of usefulness to said at least one client on said list of clients associated with said search client;

receiving information responsive to said search;

evaluating the information;

generating at least one information unit and adding said information unit to a database of information units;

associating each information unit with a preference feedback list identifying said at least one client of said information unit and a weight of usefulness;

maintaining a list for each search client using said network computer system to identify said at least one client having a history of providing useful information for said search client; and cross-referencing said at least one client on said list who have previously provided a utility weight for said information and matching said search client with at least one of said at least one client to select relevant information to be provided to said search client.

13. The method of claim 12 further comprising the step of providing an enhancement list identifying said at least one client having a history of providing useful information units.

14. The method of claim 13 further comprising the step of allocating bandwidth to said at least one client having a history of providing useful information units to said search client.

15. The method of claim 12 wherein enhancement providing step further comprises the step of tracking the usefulness to said search client of information units provided by said at least one client.

16. The method of claim 12 wherein said step of maintaining a list for each search client further comprises the step of identifying said at least one client having a history of providing information found to be non-useful.

17. The method of claim 12 further comprising the step of suggesting related categories in response to said search request.

* * * * *